United States Patent
Tsuruta et al.

(10) Patent No.: US 8,128,997 B2
(45) Date of Patent: Mar. 6, 2012

(54) METHOD OF FORMING A VIBRATION DAMPING PAINT LAYER

(75) Inventors: Naoki Tsuruta, Wako (JP); Shoji Kimura, Wako (JP); Masahiro Nushi, Tokyo (JP)

(73) Assignees: Honda Motor Co., Ltd., Minato-Ku, Tokyo (JP); Nihon Tokushu Toryo Co., Ltd., Kita-Ku, Tokyo (JP)

( * ) Notice: Subject to any disclaimer, the term of this patent is extended or adjusted under 35 U.S.C. 154(b) by 387 days.

(21) Appl. No.: 12/584,282

(22) Filed: Sep. 2, 2009

(65) Prior Publication Data

US 2010/0055335 A1    Mar. 4, 2010

(30) Foreign Application Priority Data

Sep. 4, 2008  (JP) ................................. 2008-227587

(51) Int. Cl.
   *B05D 3/02*   (2006.01)
(52) U.S. Cl. ...................... 427/384; 427/385.5; 427/387
(58) Field of Classification Search .................. None
   See application file for complete search history.

(56) References Cited

U.S. PATENT DOCUMENTS

| 6,749,920 | B1 * | 6/2004 | Caldwell et al. | 428/105 |
| 2002/0032128 | A1 * | 3/2002 | Kobayashi et al. | 508/202 |
| 2007/0048445 | A1 * | 3/2007 | DiMario | 427/180 |
| 2008/0305270 | A1 * | 12/2008 | Uhlianuk et al. | 427/385.5 |
| 2008/0305345 | A1 * | 12/2008 | Uhlianuk et al. | 428/461 |

FOREIGN PATENT DOCUMENTS

JP   07-145331   *   6/1995

* cited by examiner

*Primary Examiner* — Erma Cameron

(74) *Attorney, Agent, or Firm* — Flynn, Thiel, Boutell & Tanis, P.C.

(57) ABSTRACT

This invention provides a method of forming a vibration damping paint layer thick enough for reduction of the vibration. Applying an acrylic emulsion paint with 1~5 mm thick, which comprises greater than 77.0 wt % of solid portion, 40~50 vol % of pigment, 2-14 vol % of large sized pigment having diameter of 40-100 μm, on a surface where the vibration damping layer is desired, and heating the vibration damping paint layer at temperature lower than 140° C. for less than 25 minutes, which saves energy and saves production time. The invention saves energy necessary for heating and production time.

2 Claims, No Drawings

METHOD OF FORMING A VIBRATION DAMPING PAINT LAYER

FIELD OF THE INVENTION

This invention relates to a method of forming a vibration damping paint layer on a surface of the automobile body.

BACKGROUND OF THE INVENTION

As the automobile body is constructed with an approximately 0.8 mm thick steel plate, the body likely vibrates when the automobile runs. It is necessary to reduce the vibrations for keeping the inside room quite and comfortable so that different measures for vibration reduction have been developed.

For reducing the vibration, a vibration damping steel sheet comprising of a viscoelastic layer sandwiched between the steel sheet or a vibration damping sheet consisting of a viscoelastic materials, such as an asphalt mixed with some fillers being pressed to a sheet.

However, a vibration reduction efficiency of the vibration damping steel sheet is rather low and the sheet is rather heavy, subsequently the weight of the automobile increases, and the cost is high.

The vibration damping sheet made of asphalt exhibits enough vibration damping effect, but in a production line in a factory, it is difficult or impossible to install the vibration damping sheet onto the body automatically, therefore a worker should install the sheet manually, and which is costly.

To solve this problem, vibration damping paint, which is applied on a body surface like ordinary paint is developed and it exhibits an enough vibration damping effect. As the vibration damping paint can be conveniently applied on a desired part of the surface by spraying means, it is easy to provide an automatic production system. However, the vibration damping paint should be coated thick enough to exhibit enough vibration damping effect compared with a conventional heat setting paint, the heat drying process condition of the vibration damping paint is restricted and costly for performing the maximum efficiency.

But the current trend in the automobile industry is energy saving and high fuel efficiency, so it is required to form a vibration damping paint layer at low temperature and with short time drying process.

[Patent document 1] JP H07-145331 A
[Patent document 2] JP 2002-375865 A

DISCLOSURE OF THE INVENTION

It is an object of this invention to provide a method of forming a vibration damping layer by applying an adequate thickness paint layer thick enough for reduction of the vibration and heating the vibration damping paint layer at lower temperature and shorter heating time compared with the conventional method.

The invention of this application is forming a vibration damping paint layer by applying an emulsion paint, which comprises greater than 77.0 wt % of solid portion, 40~50 vol % of pigment, 2~14 vol % of large sized pigment having diameter of 40~100 μm, with 1.5 mm thick, on a surface where the vibration damping layer is desired, and heating the vibration damping paint layer at temperature lower than 140° C. for less than 25 minutes, which saves energy and production time.

A large sized pigment is selected from at least one material from a glass balloon, a plastic balloon, a ceramic balloon, plastic beads, glass beads, or calcium carbonate, which are all well known materials in this technical field as filler.

The emulsion paint used for this invention comprises mainly of a various kind of resin emulsion and, in addition, filler, a pigment, and other additives. The resin emulsion is preferably selected from acrylic resin, acrylic-styrene resin, vinyl acetate resin, vinyl acetate-acrylic resin, ethylene-vinyl acetate resin, epoxy resin, and urethane-alkyd resin emulsion. The resin emulsion may be used solely or combination of different kind.

The filler or coloring pigment includes barium sulfate, calcium carbonate, talc, clay, mica flakes, diatomaceous earth, carbon black, and titanium oxide, which are also used solely or combination.

The additives may include an antifoaming agent, dispersing agent, a sedimentation inhibitor, ultraviolet ray absorbent, and anti-aging agent. The additives are used solely or combination.

The solid portion of the emulsion paint of this invention should be greater than 77.0 wt % and also the volume concentration of the coloring pigment is 40~50 vol %.

If this condition of the emulsion paint is not satisfied, and the vibration damping paint is applied thick enough on a surface of the automobile body and heated with the same heating condition of this invention, water contained in the paint layer is not completely removed, consequently undesirable residue water in the paint layer becomes rather high. It is said that the desirable residue water content of the vibration damping layer is less than 3.0 wt %. In general, the residue water content of the emulsion paint designed for vibration damping exceeds the desirable residue water content, a designed vibration damping effect is not obtained, because the residue water in the vibration damping paint layer shifts the peak performance temperature band (where the best vibration damping effect is performed) to the outside of the practical usage temperature area and the loss coefficient which is an index indicating the degree of effectiveness of the vibration damping becomes totally low.

It means that the vibration damping paint layer can not perform an expected vibration damping effect. Therefor it is desirable the residue water content of the vibration-damping layer of this invention is less than 3.0 wt % for performing the expected vibration damping effect.

A volume ratio of the large sized pigment of diameter of 40~100 μm of this invention should be 2~14 vol %. When the volume content is lower than 2 vol %, the residue water remained in the finished paint layer can not be removed sufficiently. And on the other hand, when the volume content exceeds 14 vol %, the viscosity of the paint increased, which prevents dispersion of the solid particles and the finished paint layer becomes weak.

When the diameter of the large sized pigment particle is less than 40 μm, drying characteristics of the finished paint layer becomes unfavorable. And when the diameter of the large sized pigment particle is larger than 100 μm, a nozzle used for application of the paint may be clogged with large seized particles. The examples of the large sized pigment particles are glass balloon, plastic balloon, ceramics balloon, plastic beads, and glass beads.

In the drying process of the applied paint layer, the heating condition of this invention for forming a vibration damping layer should be dried at temperature equal to or less than 140° C. and heating time is less than 25 minutes. If the heating temperature exceeds 140° C. or the heating time is over 25 minutes, the object of this invention "energy saving" is not accomplished as the heating condition is almost the same as the conventional method.

Well known painting methods can be used for application of the vibration damping paint of this invention. For instance, airless spraying method, air spraying method, air assist spraying method or the like. In addition, applying by brush or by paint roller can be used.

The thickness of the vibration damping paint layer of this invention is preferably 1~5 mm. If the paint layer thickness exceeds 5 mm, the weight of the paint layer increases, which does not accord with the goal of this invention of reducing the weight of the automobile.

The method of this invention can be applicable to any desired part of the automobile, for instance, the floor panel, the dash panel, the door, the fender, the wheel housing, the pillar or the roof of the vehicle.

PREFERRED EMBODIMENT OF THE INVENTION

For more detailed explanation of the invention will be described hereinafter for better understanding of this invention. Needless to say, the scope of the invention is not limited to the following embodiments.

Example 1

Vibration damping acrylic emulsion paint 1 is prepared by mixing an acrylic resin emulsion, a calcium carbonate, and glass balloon of 45 μm diameter. The solid portion of the mixture is 77.7 wt %, the pigment volume concentration is 49.0 vol %, and the glass balloon volume concentration is 13.2 vol %.

Example 2

Vibration damping acrylic emulsion paint 2 is a mixture of the same composition of the Example 1. The solid portion of the mixture is 77.7 wt %, the pigment volume concentration is 47.0 vol %, and the glass balloon volume concentration is 10.5 vol %.

Example 3

Vibration damping acrylic emulsion paint 3 is prepared by mixing an acrylic resin emulsion same as the Example 1, a calcium carbonate, and plastic balloon of 40 μm diameter. The solid portion of the mixture is 77.7 wt %, the pigment volume concentration is 50.0 vol %, and the plastic balloon volume concentration is 13.2 vol %.

Example 4

Vibration damping acrylic emulsion paint 4 is a mixture of the same composition of the Example 3. The portion of the mixture is wt %, the pigment volume concentration is 48.0 vol %, and the plastic balloon volume concentration is 10.5 vol % is obtained.

Example 5

Vibration damping acrylic emulsion paint 5 is prepared by mixing an acrylic resin emulsion same as the Example 1, a calcium carbonate, and ceramic balloon of 45 μm diameter.

The solid portion is 77.7 wt %, the pigment volume concentration is 48.0 vol %, and the ceramic balloon volume concentration is 13.2 vol %.

Example 6

Vibration damping acrylic emulsion paint 6 is a mixture of the same composition of the Example 5.

The solid portion is 77.7 wt %, the pigment volume concentration is 46.6 vol %, and the ceramic balloon volume concentration is 10.5 vol %.

Comparative Example 1

Vibration damping acrylic emulsion paint 7 is a mixture of an acrylic resin emulsion same as the Example 1, and a calcium carbonate. The solid portion is 74.5 wt %, and the pigment volume concentration is 36.0 vol %.

Comparative Example 2

An acrylic emulsion paint 8, of which the solid portion is 75.5 wt % and the pigment volume concentration is 38.0 vol % is prepared.

Comparative Example 3

An acrylic emulsion paint 9 of 77.1 wt % of solid portion and 37.0 vol % of the pigment volume concentration is prepared.

Comparative Example 4

An acrylic emulsion paint 10 of 75.6 wt % of solid portion and 42.6 vol % of the pigment volume concentration is prepared.

Comparative Example 5

An acrylic emulsion paint 11 of 75.7 wt % of solid portion and 44.0 vol % of the pigment volume concentration is prepared.

Test Method

Acrylic emulsion paint prepared as described in Examples and comparative Examples are subjected to an evaluation test described below.

The paints are applied 3 mm thick layer by an airless spraying machine and dried by heating in an electric heater at temperature of 140° C. for 25 minutes.

After drying, the residue water in each paint layer is measured and the results of the Examples are shown in table 1 and the comparative Examples in table 2.

As shown in the table 1, the residue water content in the vibration damping paint layer of the Examples fall between a range of 2.6~2.9 wt %, which are all lower than the aforementioned preferable 3 wt % of residue water content.

On a contrary, as shown in table 2, the residue water content of the paint layer of the comparative Example 1 is 13.6 wt % and the comparative residue water content of the comparative Example 2 is 5.2 wt %, both of which exceeds the preferable residue water content limit of 3 wt %. Because the solid portion of the paint of the comparative Examples 1 and 2 are not above 77.0 wt %, and the pigment volume concentration is out of the desired range of 40~50 vol %.

Although the acrylic paint of the comparative example 3 satisfies the solid portion concentration limit of greater than 77 wt %, but does not satisfy the pigment volume concentration range of 40~50 vol %, consequently the residue water content of the paint layer is 7.5 wt %, which is above the preferable residue water content 3 wt %.

In the acrylic paint of the comparative example 4 and 5, the solid portion volume concentration are under the limit of 77 wt %, and the pigment volume concentrations fall between the range of 40~50 vol %, consequently the residue water content of the paint layer are 8.0 wt % and 4.9 wt % respectively, which are over the preferable residue water content of 3 wt %.

TABLE 1

| | Paint 1 Example 1 Glass-balloon (45 mm) (vol %) | Paint 2 Example 2 Glass-balloon (45 mm) (vol %) | Paint 3 Example 3 Plastic-balloon (40 mm) (vol %) | Paint 4 Example 4 Plastic-balloon (40 mm) (vol %) | Paint 5 Example 5 Ceramic-balloon (45 mm) (vol %) | Paint 6 Example 6 Ceramic-balloon (45 mm) (vol %) |
|---|---|---|---|---|---|---|
| Solid portion(wt %) | 77.7 | 77.7 | 77.7 | 77.7 | 77.7 | 77.7 |
| Pigment (vol %) | 49.0 | 47.0 | 50.0 | 48.0 | 48.0 | 46.0 |
| Glass-balloon (vol %) | 13.2 | 10.5 | — | — | — | — |
| Plastic-balloon (vol %) | — | — | 13.2 | 10.5 | — | — |
| Ceramic-balloon (vol %) | — | — | — | — | 13.2 | 10.5 |
| Residue water (wt %) | 2.7 | 2.8 | 2.6 | 2.8 | 2.8 | 2.9 |

TABLE 2

| | Paint 7 Comparative example 1 | Paint 8 Comparative example 2 | Paint 9 Comparative example 3 | Paint 10 Comparative example 4 | Paint 11 Comparative example 5 |
|---|---|---|---|---|---|
| Solid portion(wt %) | 74.5 | 75.5 | 77.1 | 75.6 | 75.7 |
| Pigment (vol %) | 39.0 | 38.0 | 37.0 | 42.6 | 44.0 |
| Glass-balloon (vol %) | — | — | — | — | — |
| Plastic-balloon (vol %) | — | — | — | — | — |
| Ceramic-balloon (vol %) | — | — | — | — | — |
| Residue water (wt %) | 13.6 | 5.2 | 7.5 | 8.0 | 4.9 |

[Industrial Applicability]

According to the invention of this application, the heating temperature for forming the vibration damping paint layer is lowered and also the heating time is shortened without losing the vibration damping effect of the paint layer. Therefore, it can be said that the energy consumption in the car painting process line is greatly reduced.

The invention claimed is:

1. A method of forming a vibration damping paint layer comprises applying an emulsion paint on a surface where the vibration damping layer is desired, of 1~5 mm thickness, said emulsion paint comprises greater than 77.0 wt % of a solid portion, 40~50 vol % of pigment, and 2~14 vol % of large sized pigment having a diameter of 40~100 μm, and heating the vibration damping paint layer at a temperature lower than 140° C. for less than 25 minutes.

2. A method of forming a vibration damping paint layer according to claim 1, wherein the large sized pigment is selected from at least one material from a glass balloon, a plastic balloon, a ceramic balloon, plastic beads, glass beads, calcium carbonate, and a combination thereof.

* * * * *